US012742243B2

(12) United States Patent
von Schleinitz

(10) Patent No.: US 12,742,243 B2
(45) Date of Patent: Sep. 22, 2026

(54) METHOD OF COATING METALLIC COMPONENT OF A ROLLING-ELEMENT BEARING OR A PLAIN BEARING

(71) Applicant: AKTIEBOLAGET SKF, Gothenburg (SE)

(72) Inventor: Thilo von Schleinitz, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 649 days.

(21) Appl. No.: 16/659,894

(22) Filed: Oct. 22, 2019

(65) Prior Publication Data

US 2020/0131644 A1 Apr. 30, 2020

(30) Foreign Application Priority Data

Oct. 29, 2018 (DE) ........................ 102018218507.7

(51) Int. Cl.
*C23C 24/04* (2006.01)
*F16C 19/06* (2006.01)
*F16C 33/62* (2006.01)

(52) U.S. Cl.
CPC .............. *C23C 24/04* (2013.01); *F16C 19/06* (2013.01); *F16C 33/62* (2013.01); *F16C 2223/42* (2013.01)

(58) Field of Classification Search
CPC ........... C23C 24/04; C23C 4/01; C23C 4/087; C23C 4/12
USPC .......................................................... 427/455
See application file for complete search history.

(56) References Cited

U.S. PATENT DOCUMENTS

| | | | |
|---|---|---|---|
| 3,198,735 A | 8/1965 | Lamson et al. | |
| 3,843,962 A | 10/1974 | Bogue | |
| 5,150,974 A | 9/1992 | Tamada et al. | |
| 9,109,291 B2 * | 8/2015 | Lamberton | C23C 24/04 |
| 9,610,605 B2 * | 4/2017 | Jensen | C22C 32/0094 |
| 11,167,864 B2 * | 11/2021 | Cawthorne | B05B 7/1486 |
| 2004/0099983 A1 | 5/2004 | Dirscherl | |
| 2005/0221110 A1 * | 10/2005 | Fujita | C22C 21/003 428/653 |
| 2008/0145554 A1 * | 6/2008 | Ghasripoor | C23C 4/18 508/172 |

(Continued)

FOREIGN PATENT DOCUMENTS

| | | |
|---|---|---|
| CN | 107725585 A | 2/2018 |
| CN | 108070856 A | 5/2018 |

(Continued)

OTHER PUBLICATIONS

European Search Report from the European Patent Office dated Mar. 26, 2020 in related EP application No. 19 202 393.5, including European Search Opinion, and translation thereof.

(Continued)

*Primary Examiner* — Brian K Talbot
(74) *Attorney, Agent, or Firm* — J-TEK LAW PLLC; Scott T. Wakeman; Mark A. Ussai

(57) ABSTRACT

A method of coating a metallic component of a rolling-element bearing or a plain bearing having at least one non-sandblasted surface includes directly applying a first metal coating onto at least a portion of the non-sandblasted surface by a cold spray method, preferably at a pressure of more than 50 bar. Also a coated metallic component formed by the method.

14 Claims, 1 Drawing Sheet

(56) References Cited

U.S. PATENT DOCUMENTS

| | | | | |
|---|---|---|---|---|
| 2009/0301328 | A1 * | 12/2009 | Zahiri | B41N 1/20 427/250 |
| 2010/0187119 | A1 * | 7/2010 | Almond | C23C 24/04 205/115 |
| 2011/0039024 | A1 * | 2/2011 | Jabado | C23C 24/04 427/201 |
| 2012/0128284 | A1 * | 5/2012 | Mordente | F16C 33/14 427/427 |
| 2014/0242417 | A1 | 8/2014 | Kliemann et al. | |
| 2014/0263853 | A1 * | 9/2014 | Jackson | C23C 24/04 244/53 R |
| 2017/0204920 | A1 * | 7/2017 | Poirier | C23C 24/00 |
| 2018/0002815 | A1 * | 1/2018 | McGee | C23C 8/24 |
| 2018/0112302 | A1 * | 4/2018 | Grensing | C22C 9/06 |
| 2018/0128317 | A1 | 5/2018 | Horchheimer et al. | |
| 2018/0141127 | A1 | 5/2018 | Richard | |
| 2018/0179639 | A1 * | 6/2018 | Roberge | B33Y 10/00 |
| 2018/0223902 | A1 | 8/2018 | Izawa | |

FOREIGN PATENT DOCUMENTS

| | | | |
|---|---|---|---|
| CN | 108247043 | A | 7/2018 |
| DE | 10058748 | C1 | 7/2002 |
| DE | 102007056451 | A1 | 5/2009 |
| DE | 102009019593 | A1 | 12/2010 |
| DE | 102011083054 | A1 | 3/2013 |
| DE | 102015206892 | A1 | 10/2016 |
| EP | 2778256 | A1 | 9/2014 |
| FR | 2988780 | * | 10/2013 |
| JP | H02190615 | A | 7/1990 |
| JP | 5072510 | B2 | 11/2012 |

OTHER PUBLICATIONS

Office Action and Search Report from the Chinese Patent Office dispatched Aug. 29, 2022 in related application No. 201911028587.6, and translation thereof.

Office Action and Search Report from the Chinese Patent Office dispatched Mar. 8, 2023 in related application No. CN201911028587.6, and translation thereof.

European Search Opinion from the European Patent Office dated Oct. 26, 2022 in related EP application No. 19 202 393.5, and translation thereof.

* cited by examiner

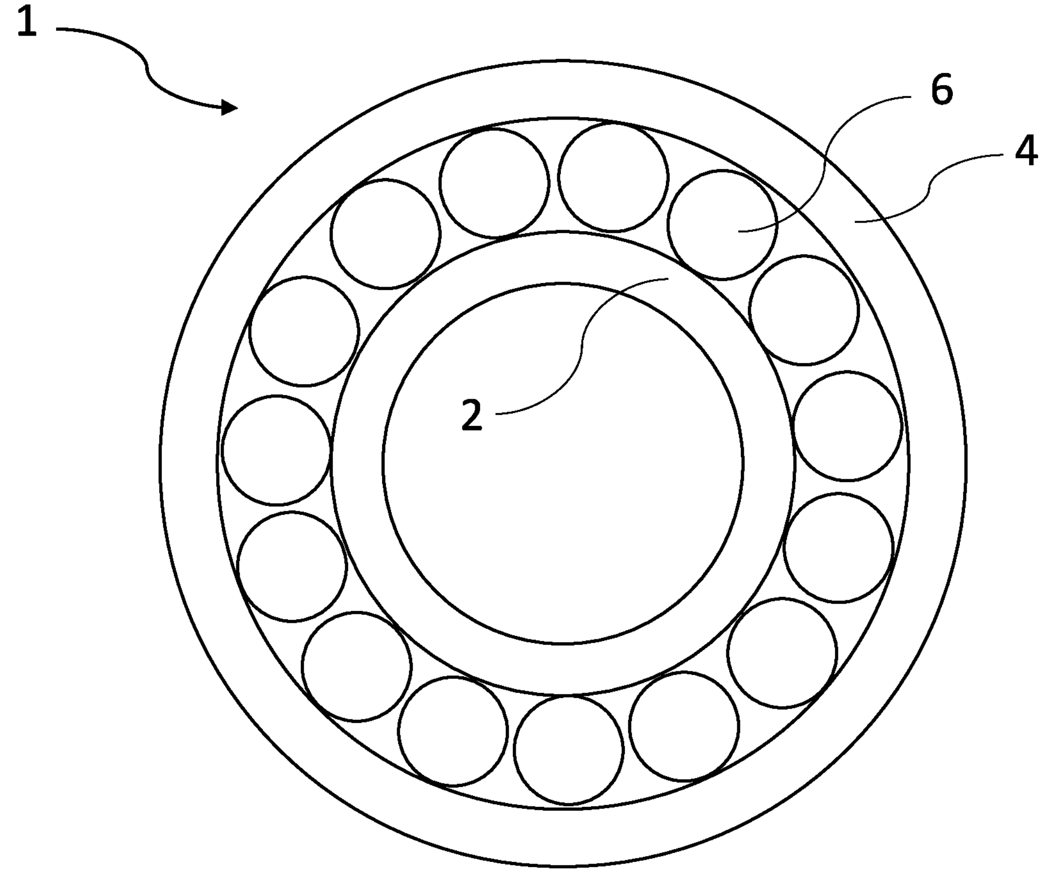
1
6
4
2

METHOD OF COATING METALLIC COMPONENT OF A ROLLING-ELEMENT BEARING OR A PLAIN BEARING

CROSS-REFERENCE

This application claims priority to German patent application no. 10 2018 218 507.7, filed on Oct. 29, 2018, the contents of which are fully incorporated herein by reference.

TECHNOLOGICAL FIELD

The present disclosure is directed to a metallic component of a rolling-element bearing or a plain bearing that is at least partially coated by a metallic coating and to a method of coating such a bearing.

BACKGROUND

Components of rolling-element bearings and plain bearings, in particular components of large bearings, often receive a galvanization as metal coating, for example, corrosion protection, on their outer surfaces. To date a flame spray galvanization is often used in addition to a coating including a zinc-containing lacquer. Such a galvanization furthermore offers the advantage that zinc provides high friction values, which are favorable for the surfaces that are used for screwing or flanging the bearing.

In order to apply a metal coating onto a surface, this surface is roughened in order to make possible an adhesion of the metal coating that can be applied by a flame spray galvanization or a cold spray method. In order to roughen the surface to be coated, it can be prepared, for example, by sandblasting. For this purpose all other surfaces that are not to be coated must first be covered. The flame spray layer adheres essentially by a mechanical interlocking and therefore requires a rough subsurface that is achieved by sandblasting. The same applies for many lacquers or coatings applied by cold spray methods.

However, it is disadvantageous here that the very hard particles of the sand jet can also damage the surfaces of the rolling-element- or plain-bearing component in addition to providing the desired roughening and can, for example, change finely worked contours or, for example, the flatness or also other dimensional and positional tolerances. Furthermore it is possible that some sandblasting particles will remain on the surface despite cleaning and find their way into the finished bearing, where they can damage the raceways and lead to considerable damage up to a premature bearing failure.

If the surfaces to be coated have been finely worked before being galvanized, the sandblasting required for the galvanization can compromise the quality of this fine working too severely, in particular the dimensional and positional tolerances. However, these are also desired on external assembly surfaces of the bearing. A post-processing of the surfaces can therefore be required after the coating in order to restore dimensional and positional tolerances. Otherwise an undefined system geometry can arise.

In addition, even if the surfaces have been prepared by sandblasting, the adhesion of a flame spray galvanization is a critical point. In order to ensure the adhesion of the flame spray galvanization, a wrapping-around of the layer is therefore usually effected, i.e., the layer completely surrounds the workpiece. However, if only flat surfaces are to be coated without a wrapping-around, there is the risk of spalling since the flame spray galvanization does not represent a closed layer and is vulnerable at its edges.

In addition, with the flame spray galvanization the zinc or zinc alloy powder is melted and blown onto the surface in drop form. In particular so-called overspray, i.e., drops passing the target laterally, can lead to a layer formation on undesired regions. A highly porous, sponge-like layer having a thickness that is difficult to control and an uneven surface thus arises. The resulting porous zinc layer has poor corrosion resistance and poor chemical resistance. Therefore flame sprayed zinc layers are usually additionally sealed with lacquers.

The above-described methods are also usually used with other metal coatings. However, the coatings thereby applied require, as described above, a roughened surface in order to adhere to the surface to be coated, and show the same disadvantages.

SUMMARY

It is therefore an aspect of the present disclosure to provide a metallic component of a rolling-element bearing or a plain bearing component with an improved metal coating that can be applied directly onto a non-sandblasted surface.

The disclosed metallic rolling-element- or plain-bearing component includes at least one non-sandblasted surface and including at least one partial metal coating. In contrast to known metallic rolling-element or plain-bearing components wherein a metal coating is applied by flame spray galvanization, for which purpose a sandblasted surface is required, the metal coating of the metallic rolling-element- or plain-bearing component proposed here is applied by a cold spray method, in particular a high-pressure cold spray method, directly onto the non-sandblasted surface.

As explained above, up to now it has been assumed that a roughened surface is required for all metallic coatings in order to make possible a good adhesion of the coating. The inventors have now surprisingly recognized that with the use of a cold spray method, in particular of a high-pressure cold spray method, with sufficiently high kinetic energy and further boundary conditions good adhesion of the coating can occur even without a prior roughening of the surface.

In the cold spray method, also called cold spray coating or gas dynamic cold spraying, a preheated gas jet is generated into which a predominantly metallic powder is fed-in, which, however, is not melted. The powder can include, for example, iron, zinc, copper, tin, aluminum, steel, or a combination thereof. When the powder impinges on the non-roughened, in particular non-sandblasted surface, with suitable parameterization the powder binds to the surface in a welding manner and forms a coating.

Since no roughening of the surface of the metallic rolling-element- or plain-bearing-component is necessary, but instead the metal coating can be applied directly onto the non-sandblasted surface, the metallic rolling-element- or plain-bearing component can already be coated in its final form, i.e., with existing dimensional and positional tolerances. In particular, using the cold spray method the metal coating can be applied directly onto ground surfaces. Since a sandblasting of the surface to be coated is not required, sandblasting particles can be prevented from adhering to the rolling-element- or plain-bearing component after the coating process, which could lead to damage of a bearing wherein the rolling-element- or plain-bearing component is installed. However, prior to the coating process it is advantageous to degrease and to clean the surfaces to be coated in order to make possible a better adhesion of the metal coating.

In addition to the possibility of coating entire surfaces, there is also the possibility of coating only small partial regions of a surface and to generate here either coating surfaces that are not connected to one another locally, or also to generate a track completely encircling the plain- or rolling-element-bearing component, as can be favorable, for example, for a seal raceway.

In contrast to a coating that is applied by flame spray galvanization, the cold gas sprayed metal layer is not porous and therefore need not be lacquered or sealed. Furthermore the metal coating has a greater density than a layer applied by flame spray galvanization. With suitable parameterization, layer densities of approximately 99% are achievable, which thus hardly differ from solid pore-free metal. Accordingly the metal coating can be embodied very thin, for example, in the range of 50 μm to 150 μm.

Furthermore, a thermal load arises on the workpiece during flame spraying. It becomes hot, which can not only be detrimental to the properties of the workpiece and the internal stresses of the layer, but also delays a further processing and assembly of the workpiece after the coating. On the other hand, with cold spraying the thermal influence on the work piece is significantly lower, whereby the plain- or rolling-element-bearing component is significantly less compromised.

The metallic rolling-element- or plain-bearing component can be, for example, the ring of a bearing, in particular of a large bearing. Other components of a bearing can also be provided with a metal coating, which, as described here, is applied by a cold-spray method.

The metal coating is preferably applied using a high-pressure cold spray method, preferably at more than 50 bar. In particular the pressure of the gas jet can fall in the range of 50 to 100 bar.

Due to this high pressure the mixture of the gas jet and the powder is accelerated via a nozzle to multiple supersonic speed, wherein it is cooled again in the context of the relaxation. Here the particles of the powder in the gas jet impinge on the surface of the metallic rolling-element- or plain-bearing component with high kinetic energy, in particular at a speed of up to 1000 m/s. However, the powder particles here are no longer hot or molten. Rather, the particles adhere to the surface of the metallic rolling-element- or plain-bearing component by local conversion of the kinetic energy, which leads to a type of welding of the powder onto the surface. A "welding" is understood here to mean an adhesion that falls far above the values of mechanical interlocking. It can be, for example, a pull-off adhesion value of approximately 50 MPa. This is up to 10 times more than is expected from many lacquer systems as adhesion. The adhesion mechanism with the cold spray method, in particular the high-pressure cold spray method, is therefore not based on an interlocking of the particles on the surface as is the case with a flame spray galvanization, but rather on a connecting of the powder to the surface. This connection can be generated particularly well using high pressure.

After the application of the coating using the cold spray method, in particular a high-pressure cold spray method, the powder supply can be switched off and the gas stream, for example, nitrogen, can be continued. It is thereby possible to use the typically robot-guided cold spray gun in a similar manner to a high-pressure compressed-air gun. Possibly overlying loose material particles that could have been deposited on the workpiece surface in the spray booth can be blown off by a the programmed coating geometry being deviated from again. Such particles do not reach the hardness of sandblasting grains and are far less dangerous for the bearing, but the coating system can be used without additional technical effort as a final cleaning system directly after the coating process.

The combination of the metallic rolling-element- or plain-bearing component or the non-sandblasted surface of the metallic rolling-element- or plain-bearing component and the at least one partial metal coating that has been produced via kinetic bombardment by the cold spray method, has residual compressive stresses. These residual compressive stresses of the material increase the resistance of the metallic rolling-element- or plain-bearing component, in particular the resistance against crack formation on the surface, and the resistance against a chemical or corrosive attack. The base material of the metallic rolling-element- or plain-bearing component is compressed by the cold spray method and receives compressive residual stresses in a similar manner as with non-abrasive shot peening, and the metal coating itself also receives compressive stresses. This increases the stability and impermeability of the entire metallic rolling-element- or plain-bearing component.

In particular the metal coating can be a corrosion protection layer. For the corrosion protection layer, zinc or aluminum as powder, or a combination thereof, can be supplied to the gas jet of the cold spray method.

According to one embodiment the metal coating additionally or alternatively includes friction-changing particles. For example, the powder for the cold-spray method can include friction-changing particles as hard-material particles. Alternatively, friction-changing particles can be added to the powder that includes metals for corrosion protection. In particular, these hard-material particles can be titanium diboride for increasing the friction. The friction-changing particles can be used either for increasing or for lowering the friction of the coated surface.

According to a further embodiment the metal coating is configured as a first and at least one second layer that are applied one-over-the other using the cold-spray method, in particular the high-pressure cold spray method. For example, the first layer can be a corrosion-protection layer, and the second layer a friction-changing layer. Further layers or combinations of layers are also possible.

It is possible to connect the cold spray gun used for coating to a plurality of powder-supply systems that inject powder in parallel or selectively. A multilayer system made of various materials can thereby be applied using the same gun without modification. For example, rolling-element bearing rings can be through-hardened or also only case hardened in the raceway region so that the external geometry to be coated can have very different hardness depending on the design. The weldability of the supplyable metal powders is then not given in all cases. It can therefore be necessary to spray-on a first layer onto the ring, which layer has the property of an adhesion promoter and is selected such that it welds to the subsurface. The actual desired layer can then in turn be sprayed-on onto this adhesion-promoter layer, which actual desired layer welds to the adhesion-promoter layer. Depending on the ring material and hardness a layer of pure iron or of stainless steel can be deposited, for example, under a zinc layer, whereby the adhesion strength of the entire system is very greatly increased compared to a pure zinc layer.

Instead of providing a protective layer by the metal coating, or in addition to such a protective layer, it is also possible to use the metal coating for changing the shape of the metallic rolling-element- or plain-bearing component. For example, iron- or steel-powders are suitable for this purpose. If the metal coating is not applied as a thin protective layer, but rather locally as thicker layer, the applied metal can, for example, change the shape of the surface in order to form a shoulder or a plateau. In this way it is possible to adjust the shape of the metallic rolling-element- or plain-bearing component without performing a mechanical processing by milling or the like.

The metal coating can also contain stain-resistant particles or stainless steel particles that are supplied to the gas jet of the cold spray method. In particular such a metal coating can serve as a base for further layers.

Furthermore a method is disclosed for manufacturing a metallic rolling-element- or plain-bearing component including at least one non-sandblasted surface and including at least one partial metal coating. Here the metal coating is directly applied onto the non-sandblasted surface using a cold spray method, in particular a high-pressure cold spray method. As explained above, this has the advantage that the surface to be coated can already be coated in its final shape.

In particular the metal coating is applied under high pressure, preferably at more than 50 bar. Due to the high pressure a type of welding of the particles is effected; the particles are applied to the non-sandblasted surface by the cold spray method. In comparison to coatings used up to now that are applied by flame spray galvanization, these "welded" particles have the advantage that they can better adhere without pre-treatment of the surface to be coated. The metal coating applied by the cold spray method is not porous and therefore also need not be lacquered or sealed.

According to a further embodiment, after the application of the metal coating at least one second layer can be applied using the cold spray method, in particular the high-pressure cold spray method. As explained above, further layers can also be applied using the cold spray method.

Furthermore, the shape of the metallic rolling-element- or plain-bearing component can be changed by the application of the metal coating. For example, the metal coating can be applied in the shape of a shoulder or of a plateau in order to change the shape of the metallic rolling-element- or plain-bearing component without milling or other mechanical processing. For this purpose only the metal coating need be applied thicker or multiple times to the points provided for this purpose. In this way a simple adapting of the shape of a metallic rolling-element- or plain-bearing component is possible.

The cold spray method, in particular the high-pressure cold spray method, furthermore has the advantage that the particles contained in the gas jet only adhere to the surface of the metallic rolling-element- or plain-bearing component when the particles impinge on the surface in a straight, unbraked trajectory and at a sufficiently steep angle, ideally a perpendicular angle. If the particles impinge on the surface at too flat an angle, no adhesion results. It is therefore possible that the metal coating is configured as a partial coating. For example, a can be sprayed-into in the axial direction, wherein in contrast to an applying of a coating by flame spray galvanization no adhesion results on the walls. Only the region wherein the gas jet impinges at a perpendicular or essentially perpendicular angle is coated. Therefore the covering- and masking-requirement is lower with the cold spray method than with a flame spray galvanization.

Due to the significantly more precise material-application having lesser and constant overspray, more uniform volume throughput, and a dense, non-porous layer, the layer-thickness tolerances are significantly lower with the use of the cold spray method, in particular the high-pressure cold spray method, than with a flame spray galvanization. Accordingly the dimensional and positional tolerances of the surface to be coated are shifted in a predictable manner and not worsened in a critical manner. Under certain boundary conditions tests showed a reduction with the inventive method of the layer thickness scattering to only 1/10 of the scattering of the flame spraying.

Further advantages and advantageous embodiments are provided in the description, the drawings, and the claims. Here in particular the combinations of features specified in the description and in the drawings are purely exemplary, so that the features can also be present individually or combined in other ways.

In the following the invention shall be described in more detail using exemplary embodiments depicted in the drawings. Here the exemplary embodiments and the combinations shown in the exemplary embodiments are purely exemplary and are not intended to define the scope of the invention. This scope is defined solely by the pending claims.

BRIEF DESCRIPTION OF THE DRAWING

FIG. 1 is a schematic sectional view of a rolling-element bearing according to the present disclosure.

DETAILED DESCRIPTION

In the following, identical or functionally equivalent elements are designated by the same reference numbers.

In FIG. 1 a rolling-element bearing 1 is depicted in a greatly simplified outline. The rolling-element bearing 1 includes an inner ring 2 and an outer ring 4. Rolling elements 6 are rotatably disposed between the two rings 2, 4. The rolling elements 6 can be held spaced from one another by a not-shown cage. Alternatively, instead of the rolling-element bearing 1 the bearing can also be a plain bearing.

The various components of the rolling-element bearing 1, for example, the inner ring 2, the outer ring 4, or the rolling elements 6, can be provided as metallic rolling-element- or plain-bearing components that have a non-sandblasted surface. Here at least one non-sandblasted surface can be provided with at least one partial metal coating. Here the metal coating is directly applied onto the non-sandblasted surface using a cold spray method, in particular a high-pressure cold spray method.

For example, the metal coating can be a corrosion protection layer. Such a layer can be used to provide the inner ring 2 or the outer ring 4 with a protective layer in order to protect the components against corrosion or rust.

Up to now it has been assumed that for such a metal coating a roughening, for example, by sandblasting, of the surface to be coated is required so that the metal coating that is applied using a flame spray galvanization method, as lacquer, or using a cold spray method, adheres to the surface.

However, it has been surprisingly found that with the cold spray method used here, in particular performed as a high-pressure cold spray method, it is not necessary to previously roughen the surfaces of the components 2, 4 by sandblasting. This means that the metal coating can be applied onto a surface of the components 2, 4 that is already present in its final shape. In particular no dimensional or positional tolerances are influenced by the application of the metal coating.

The metal coating is applied onto the surface of the metallic rolling-element- or plain-bearing component 2, 4, 6 in particular using a high-pressure cold spray method at more than 50 bar. By applying the metal coating under high pressure a type of welding occurs of the metal particles, which are present in the gas jet of the cold spray method, to the surface of the rolling-element- or plain-bearing component 2, 4, 6. Due to this welding a particularly stable metal coating arises which, in contrast to a flame spray galvanized coating, shows a low risk of spalling. Furthermore the metal coating, which is applied by such a cold spray method, is not porous, for which reason an additional lacquering or sealing can be omitted.

Alternatively or additionally the metal coating can also be applied onto the inner ring 2 or the outer ring 4 such that the shape of the components 2, 4 is changed. For example, the metal coating can be applied onto one of the rings 2, 4 in the shape of a shoulder or of a plateau. For this purpose it is only necessary, using the cold spray method, in particular the high-pressure cold spray method, to apply a thicker metal coating, or to apply the metal coating in multiple layers at one point.

Due to the disclosed metallic rolling-element- or plain-bearing component it is possible to provide a rolling-element- or plain-bearing component that includes an improved metal coating that is more stable in comparison to known coatings that are applied, for example, by flame spray galvanization, and can be applied onto an untreated or non-sandblasted surface.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved coated metallic components of rolling-element and plain bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Rolling-element bearing
2 Inner ring
4 Outer ring
6 Rolling element

What is claimed is:

1. A method comprising:

providing a metallic component of a rolling-element bearing or a plain bearing having at least one non-sandblasted surface; and directly applying a first non-porous metal coating onto at least a portion of the at least one non-sandblasted surface by a cold spray method, wherein the cold spray method comprises applying the first non-porous metal coating at a pressure of more than 50 bar.

2. The method according to claim 1, including applying a second metal coating on the first metal coating using the cold spray method.

3. The method according to claim 1, wherein directly applying the first non-porous metal coating changes the shape of the metallic component.

4. The method according to claim 1, wherein the first non-porous metal coating is applied in a straight unbraked trajectory perpendicular to the non-sandblasted surface.

5. The method according to claim 1, wherein the cold spray method comprises adding a powdered metal to a volume of a gas and directing the gas and metal mixture toward the non-sandblasted surface.

6. The method according to claim 1, wherein directly applying the first non-porous metal coating changes the shape of the metallic component, wherein the first non-porous metal coating is applied in a straight unbraked trajectory perpendicular to the non-sandblasted surface, and wherein the cold spray method comprises adding a powdered metal to a volume of a gas and directing the gas and metal mixture toward the non-sandblasted surface.

7. The method according to claim 6, including applying a second metal coating on the first non-porous metal coating using the cold spray method.

8. The method according to claim 1, wherein directly applying a first non-porous metal coating comprises directly applying an iron powder and/or a steel powder by the cold spray method.

9. The method according to claim 8, including forming a second metal coating on the first non-porous metal coating by applying a zinc powder and/or an aluminum powder on the first non-porous metal coating by the cold spray method.

10. The method according to claim 9, wherein directly applying the first non-porous metal coating changes the shape of the metallic component, and wherein the first non-porous metal coating is applied in a straight unbraked trajectory perpendicular to the non-sandblasted surface.

11. The method according to claim 8, wherein directly applying a first non-porous metal coating comprises directly applying the first non-porous metal coating to at least one partial region of the metallic component.

12. The method according to claim 1, wherein a thickness of the first non-porous metal coating is from 50 μm to 150 μm.

13. The method according to claim 1, wherein the first non-porous metal coating has a layer density of approximately 99%.

14. The method according to claim 1, wherein the at least one non-sandblasted surface is a metal surface.

* * * * *